(12) United States Patent
Eichman

(10) Patent No.: US 8,068,936 B2
(45) Date of Patent: Nov. 29, 2011

(54) METHOD AND SYSTEM FOR MANAGING MULTIPLE MODEL VARIANTS

(75) Inventor: Jay E. Eichman, Campobello, SC (US)

(73) Assignee: Electrolux Home Products, Inc., Charlotte, NC (US)

( * ) Notice: Subject to any disclaimer, the term of this patent is extended or adjusted under 35 U.S.C. 154(b) by 442 days.

(21) Appl. No.: 12/393,581

(22) Filed: Feb. 26, 2009

(65) Prior Publication Data

US 2010/0217441 A1     Aug. 26, 2010

(51) Int. Cl.
G05B 13/00    (2006.01)
G05D 23/00    (2006.01)

(52) U.S. Cl. ......................................... 700/275; 62/157

(58) Field of Classification Search .................. 700/275, 700/276, 277, 299, 300; 62/175, 203, 335, 62/441, 442, 157

See application file for complete search history.

(56) References Cited

U.S. PATENT DOCUMENTS

| | | | |
|---|---|---|---|
| 6,665,384 B2 | 12/2003 | Daum et al. | |
| 6,782,706 B2 | 8/2004 | Holmes et al. | |
| 6,993,615 B2 | 1/2006 | Falcon | |
| 7,043,577 B2 | 5/2006 | Hooker et al. | |
| 7,117,286 B2 | 10/2006 | Falcon | |
| 2004/0216471 A1 | 11/2004 | Kim et al. | |
| 2006/0261220 A1 | 11/2006 | Lee et al. | |
| 2007/0016852 A1 | 1/2007 | Kim et al. | |
| 2007/0157642 A1* | 7/2007 | Ferragut et al. | 62/139 |

OTHER PUBLICATIONS

Machine Translation of KR 2008-0114174 A.*

* cited by examiner

*Primary Examiner* — Ryan Jarrett
(74) *Attorney, Agent, or Firm* — Pearne & Gordon LLP

(57) ABSTRACT

According to one aspect, the present invention provides a method of controlling operation of a plurality of different model variants of a refrigeration appliance using a commonly-configured control board for the plurality of different model variants. The method includes identifying the first model variant as being one of the plurality of model variants to be controlled; and responsive to this identifying, selecting a suitable control routine from among a plurality of available control routines that are accessible to the control board for controlling operation of the plurality of model variants. The plurality of available control routines includes at least a first control routine to be executed for controlling operation of a portion of a refrigeration circuit provided to the first model variant and a second control routine to be executed for controlling operation of a portion of a refrigeration circuit provided to the second model variant. The first control routine is different than the second control routine. The first control routine is to be executed to control operation of the portion of the refrigeration circuit provided to the first model variant.

14 Claims, 4 Drawing Sheets

METHOD AND SYSTEM FOR MANAGING MULTIPLE MODEL VARIANTS

BACKGROUND OF THE INVENTION

1. Field of the Invention

This application relates generally to a control method and control system for controlling operation of model variants of a kitchen appliance, and more specifically to a control method and system that automatically determines the model variant of the kitchen appliance and adapts its operation according to that particular model variant.

2. Description of Related Art

Kitchen appliances such as refrigerators typically come in a variety of models, some of which operate under the same basic principle but differ in the extent of their performance. For example, an appliance commonly referred to as an "all refrigerator" includes a fresh food compartment in which the temperature is maintained by a refrigeration circuit of the refrigerator within a range of about 34° F. to about 42° F. Such an appliance is called an all refrigerator because it has a fresh food compartment and lacks a freezer compartment in which the temperature is maintained below the freezing temperature of water by the refrigeration circuit. Similar to an all refrigerator, a wine cooler also includes a main compartment and lacks a freezer like the fresh food compartment, but the temperature in the wine compartment is usually maintained within a range of 49° F. to about 60° F., a range that is more temperate than the temperature range within the fresh food compartment of the all refrigerator.

Both the all refrigerator and the wine cooler include main compartments in which food items are to be placed and maintained close to a desired temperature. And both include a refrigeration circuit provided with a compressor, condenser and evaporator through which a refrigerant is cycled in various states to remove thermal energy from their respective main compartment. However, one difference between the two is that the refrigeration circuit of the all refrigerator will likely have a greater capacity to remove thermal energy than the refrigeration circuit of the wine cooler. This difference is primarily due to the colder temperature to be maintained within the fresh food compartment compared to the temperature maintained within the main compartment of the wine cooler, and the volume difference between the two compartments. The all refrigerator is also likely to include a user interface that offers a user different cooling options from which to choose than the user interface provided to the wine cooler.

Despite these differences between the all refrigerator and wine cooler model variants of a refrigeration appliance, both operate to remove thermal energy from their respective compartment in much the same way. Further, manufacturers may even assemble more than one model variant at the same facility to minimize stocking parts common to all such model variants at different facilities. However, each model variant has traditionally been assembled from various components that are dedicated for use only with a specific model variant, and incompatible with other model variants. This has required manufacturers to purchase and warehouse different components for each model variant.

Accordingly, there is a need in the art for a control method and an appliance including a plurality of model variants, each including a common controller that automatically determines the model variant of the appliance to which it has been provided and adapts its control operations to control that particular model variant.

BRIEF SUMMARY

According to one aspect, the present invention provides a method of controlling operation of a plurality of different model variants of a refrigeration appliance using a commonly-configured control board for the plurality of different model variants. The method includes identifying the first model variant as being one of the plurality of model variants to be controlled; and responsive to this identifying, selecting a suitable control routine from among a plurality of available control routines that are accessible to the control board for controlling operation of the plurality of model variants. The plurality of available control routines includes at least a first control routine to be executed for controlling operation of a portion of a refrigeration circuit provided to the first model variant and a second control routine to be executed for controlling operation of a portion of a refrigeration circuit provided to the second model variant. The first control routine is different than the second control routine. The method also includes executing the first control routine to control operation of the portion of the refrigeration circuit provided to the first model variant to adjust an internal temperature of an enclosed chamber of the first model variant to a refrigerated temperature that is less than an ambient temperature in an environment of the first model variant.

According to another aspect, the present invention provides a method of controlling a refrigeration appliance. The refrigeration appliance includes a plurality of different model variants each comprising a commonly configured control board. The method according to the present aspect includes evaluating an identification signal to identify a particular model variant to be controlled by the control board, and receiving input entered via a control panel related to a desired operational state of the particular model variant. An appropriate set of computer-executable instructions is selected for controlling operation of the particular model variant based at least in part on the evaluation of the identification signal. The method also includes initiating execution of the appropriate set of computer-executable instructions to control operation of the particular model variant identified by the identification signal.

According to another aspect, the present invention provides a refrigeration appliance that includes at least a first model variant and a second model variant that is different than the first model variant. Each of the first and second model variants includes a refrigeration circuit through which a refrigerant travels to remove thermal energy from an internal compartment of the refrigeration appliance, the refrigeration circuit including at least a compressor and an evaporator. A commonly-configured control board is to be installed on each of the first and second model variants and includes a computer-readable memory storing a library of computer-executable instructions that define at least one predetermined control routine specific to each different model variant for controlling operation of the refrigeration circuit provided to each different model variant. The refrigeration appliance also includes a control panel operatively coupled to communicate with the central control board, the control panel including an input device an operator can use to input a desired operational state of the refrigeration appliance. The control board identifies the model variant based at least in part on an identification signal received by the central control panel and initiates execution of appropriate computer-executable instructions from the library to carry out the control routine specific to the model variant.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF ILLUSTRATIVE EMBODIMENTS

Figure 1:
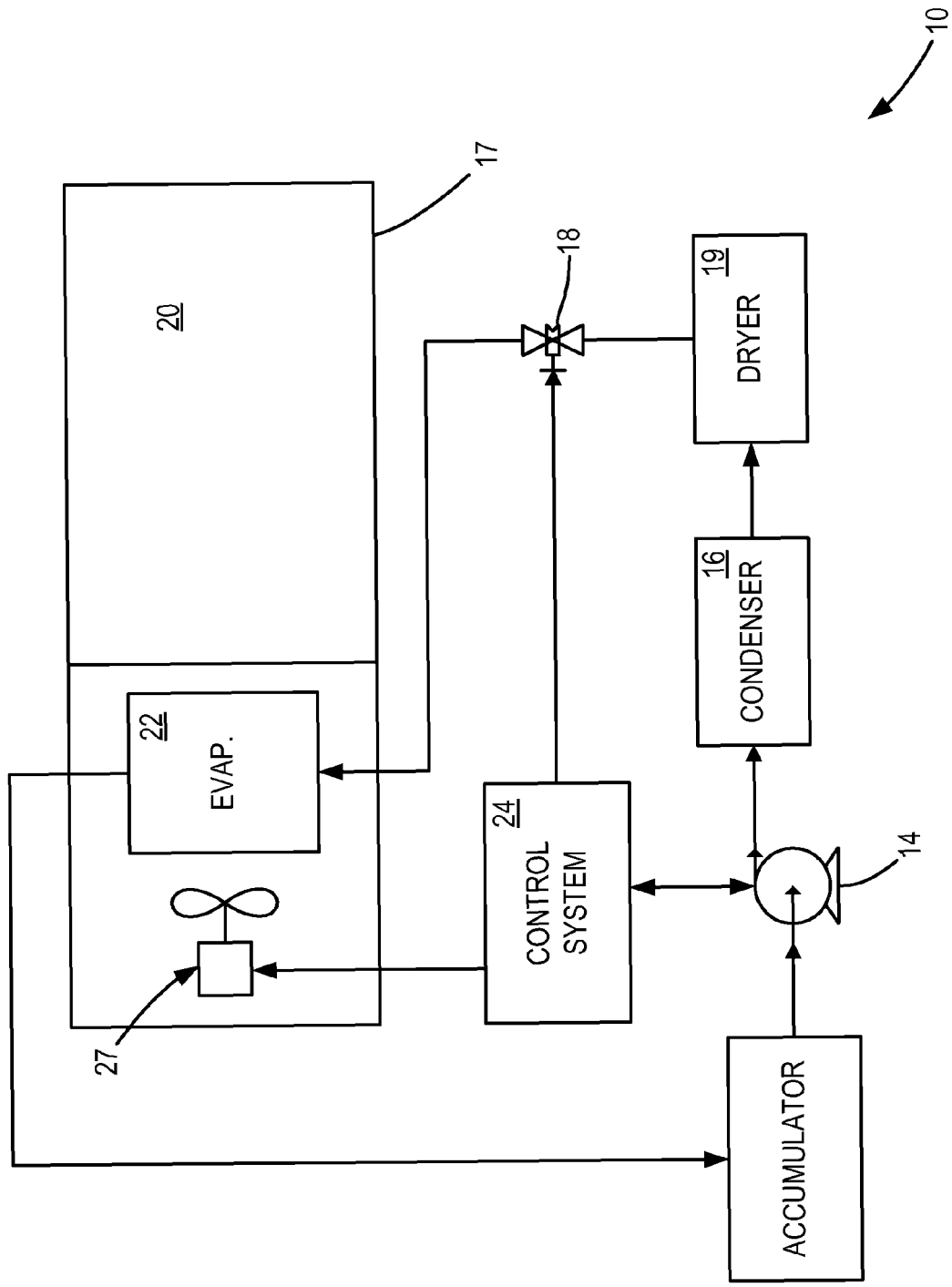
FIG. 1 shows a block diagram schematically illustrating portions of a refrigeration appliance in accordance with an aspect of the present invention.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

FIG. 1 is a block diagram schematically illustrating portions of a refrigeration appliance 10 in accordance with an embodiment of the present invention. A refrigeration circuit 12 removes thermal energy from at least one interior compartment 20 defined by a cabinet 17 of the refrigeration appliance 10 to maintain the temperature in the interior compartment 20 to a temperature within a desired range. Portions of the refrigeration circuit are shown in FIG. 1 externally of the cabinet 17 to clearly describe the refrigeration appliance 10, but it is to be understood that the refrigeration circuit 12 can optionally be housing at least partially, or entirely within the cabinet 17 without departing from the scope of the present invention.

The refrigeration circuit 12 includes a compressor 14 that compresses a gaseous refrigerant into a liquid, causing the temperature of the refrigerant to rise with the change in pressure. Latent heat is also given off by the refrigerant during the state change from a gas to a liquid. Thermal energy from the warm liquid refrigerant is transferred to an ambient environment of the refrigeration appliance 10 as the liquid refrigerant flows through condenser coils 16, thereby cooling the refrigerant. The liquid refrigerant then passes through an expansion valve 18 that separates the high-pressure environment of the liquid refrigerant from a lower-pressure environment having a pressure suitable for the liquid refrigerant to vaporize. This lower-pressure environment includes evaporator coils 22 through which the refrigerant travels as it vaporizes, and at least a portion of the evaporator coils 22 is exposed to an airflow directed into the interior compartment 20 defined by the refrigeration appliance 10 to cool the airflow, and accordingly the temperature within the interior compartment 20. Latent heat required to change the refrigerant from a liquid to a gas is drawn into the refrigerant from the airflow through the evaporator coils 22, thereby removing thermal energy from within the airflow, which is to be subsequently introduced into the internal compartment 20 and lower the temperature therein.

When it is desired to lower the temperature within the internal compartment 20 the compressor 14 is activated by a control system 24 to cause the refrigerant to flow through the refrigeration circuit 12. A fan 27 can also be activated to direct the airflow over the evaporator coils 22. Likewise, when the temperature within the internal compartment 20 reaches a predetermined lower limit that can optionally be adjusted the control system 24 in response to operator input, the control system 24 can terminate operation of the compressor 14 and the fan 27. When the temperature rises to a set temperature corresponding to an operational mode of the refrigeration appliance 10 selected by an operator the compressor 14 and fan 27 can once again be activated to lower the temperature within the internal compartment 20. This cyclical operation of the compressor 14 by the control system 24 maintains the temperature inside the internal compartment 20 within a suitable tolerance of a set temperature input to the control system 24 and corresponding to the operational mode of the refrigeration appliance 10 selected by the operator via a control panel 32 (FIG. 3) provided to the control system 24. This range of temperatures, the set temperature, and/or one or both of the upper limit or lower limit temperatures can optionally be adjusted by the operator via the control panel 32. Different temperatures, and the tolerance relative to those temperatures, can optionally be maintained by varying the duration of the compressor's activation, the frequency at which the compressor 14 is activated, an operational speed of the fan 27, or any combination thereof.

Figure 2:
FIG. 2 shows a perspective view of a residential kitchen including a plurality of model variants of a refrigeration appliance.

Three different examples of model variants of the refrigeration appliance 10 are shown in FIG. 2. An all refrigerator 28 model variant of the refrigeration appliance 10 includes a single interior compartment 20, commonly referred to as the fresh food compartment, in which the temperature is maintained above freezing, and within a range extending from about 33° F. to about 40° F., alternately within a range extending from about 34° F. to about 38° F. This model variant is referred to herein as an all refrigerator 28 because it lacks a second interior compartment, commonly referred to as a freezer compartment, insulated from the fresh food compartment and in which the temperature would be maintained at or below freezing, and according to the present embodiment within a range extending from about −5° F. to about 10° F., alternately within a range extending from about 0° F. to about 5° F.

Also shown in FIG. 2 is an all freezer 29 model variant of the refrigeration appliance 10. Like the all refrigerator 28, the all freezer 29 model variant of the refrigeration appliance 10 includes a single interior compartment, commonly referred to as the freezer compartment, in which the temperature is maintained below freezing, optionally within a range extending from about −5° F. to about 10° F., alternately within a range extending from about 0° F. to about 5° F. This model variant is referred to herein as an all freezer 29 because it is not combined with a fresh food compartment as a second interior compartment defined by the same refrigeration appliance 10 that is also cooled with a common refrigeration circuit 12.

The third model variant of the refrigeration appliance 10 shown in FIG. 2 is a wine cooler 30. Like the all refrigerator 28 and the all freezer 29, the wine cooler 30 includes a single interior compartment referred to as the wine compartment in which the temperature is controlled by the refrigeration circuit 12 and control system 24. However, the volume of the interior compartment 25 of the wine cooler 30 is typically, but not necessarily smaller than the volume of the interior compartments of the all refrigerator 28 and all freezer 29. Further, the temperature inside the interior compartment of the wine cooler 30 is maintained within a temperature range that extends to a warmer upper limit than the upper limit of the temperature range to be maintained inside the interior compartment 20 of the all refrigerator 28 and the interior compartment of the all freezer 29. For example, the temperature within the interior compartment of the wine cooler 30 can be maintained within a range extending from about 40° F. to about 65° F., alternately within a range extending from about 49° F. to about 60° F.

Thus, the all refrigerator 28 and all freezer 29 can be provided with a refrigeration circuit 12 having a greater capacity to remove thermal energy from their interior compartments than the refrigeration circuit 12 provided to the wine cooler 30, but operating based on the same general principle of cooling. The greater cooling capacity can be attributed to evaporator coils 22 having a greater number of turns and/or a larger heat transfer surface area than the evaporator coils 22 provided to the wine cooler 30, or to a larger compressor with greater compression capacity, a different refrigerant can be used for at least one model variant than for the others, a larger compressor can be provided to the all freezer 29 and/or all refrigerator 28 than to the wine cooler 30, etc. . . . But despite these differences, the refrigeration circuits 12 of all three model variants operate under the same basic principle, and as mentioned above, differ in areas such as the extent of their operation to suitably maintain the temperature within their respective interior compartments for their intended applications, and the cooling capacity.

Although the three model variants shown in FIG. 2 and described above are an all refrigerator 28, all freezer 29 and wine cooler 30, it is noted that the model variants of the refrigeration appliance 10 according to the present invention are not so limited. A model variant can be any refrigeration appliance 10 including at least one interior compartment 20 in which the temperature is maintained at a temperature below an ambient temperature of the refrigeration appliance 10. Each model variant of a refrigeration appliance 10 also includes a refrigeration circuit 12 that is controlled similar to the refrigeration circuit 12 provided to other model variants, but to a greater or lesser extent than the other model variants. Other examples of model variants of a refrigeration appliance include, but are not limited to: a side-by-side freezer/refrigerator, which includes both freezer and fresh food compartments arranged horizontally next to each other; a top mount freezer/refrigerator combination, which includes both freezer and fresh food compartments arranged vertically with the freezer compartment arranged on top of the fresh food compartment; a bottom mount freezer/refrigerator combination, which includes both freezer and fresh food compartments arranged vertically with the freezer compartment mounted below the fresh food compartment; and the like. However, for the sake of clearly describing the present invention, the different model variants discussed in detail below are the all refrigerator 28 and the wine cooler 30.

The wine cooler 30, the all refrigerator 28, the all freezer 29, or any combination of the model variants shown in FIG. 2, as well as any other model variant, can include a control panel 32 that an operator can use to input a command and/or select a desired operational mode or set temperature for the respective model variant of the refrigeration appliance 10. A knob, button, switch, or any suitable type of input device 34 such as that shown schematically on the control panel 32 in FIG. 3, or any combination thereof can be provided to allow the operator to establish the desired operational mode of the refrigeration appliance 10, change a set temperature to be maintained within a reasonable tolerance in the interior compartment, one or both limits of a target temperature range to be maintained within the interior compartment 20, or any combination thereof. The control panel 32 can also optionally include a display device 36 that can display information relating to the operational state of the refrigeration appliance 10 such as the current temperature within an interior compartment 20 of the refrigeration appliance 10, for example. The illustrative display device 36 in FIG. 3 includes a four digit, seven-segment LED display for displaying the current temperature within the interior compartment 20 of the wine cooler 30 in units of degrees Fahrenheit, but any display device 36 that can visibly display information to an operator is within the scope of the present invention. The control panel 32 can optionally be provided to any of the model variants of the refrigeration appliance 10, including the all refrigerator 28, the all freezer 29, or all such model variants shown in FIG. 2. For the all refrigerator 28 model variant, for example, the control panel 32 can be disposed within the interior compartment 20, such that access to such a control panel is restricted by the door enclosing the interior compartment 20, when closed.

Figure 3:
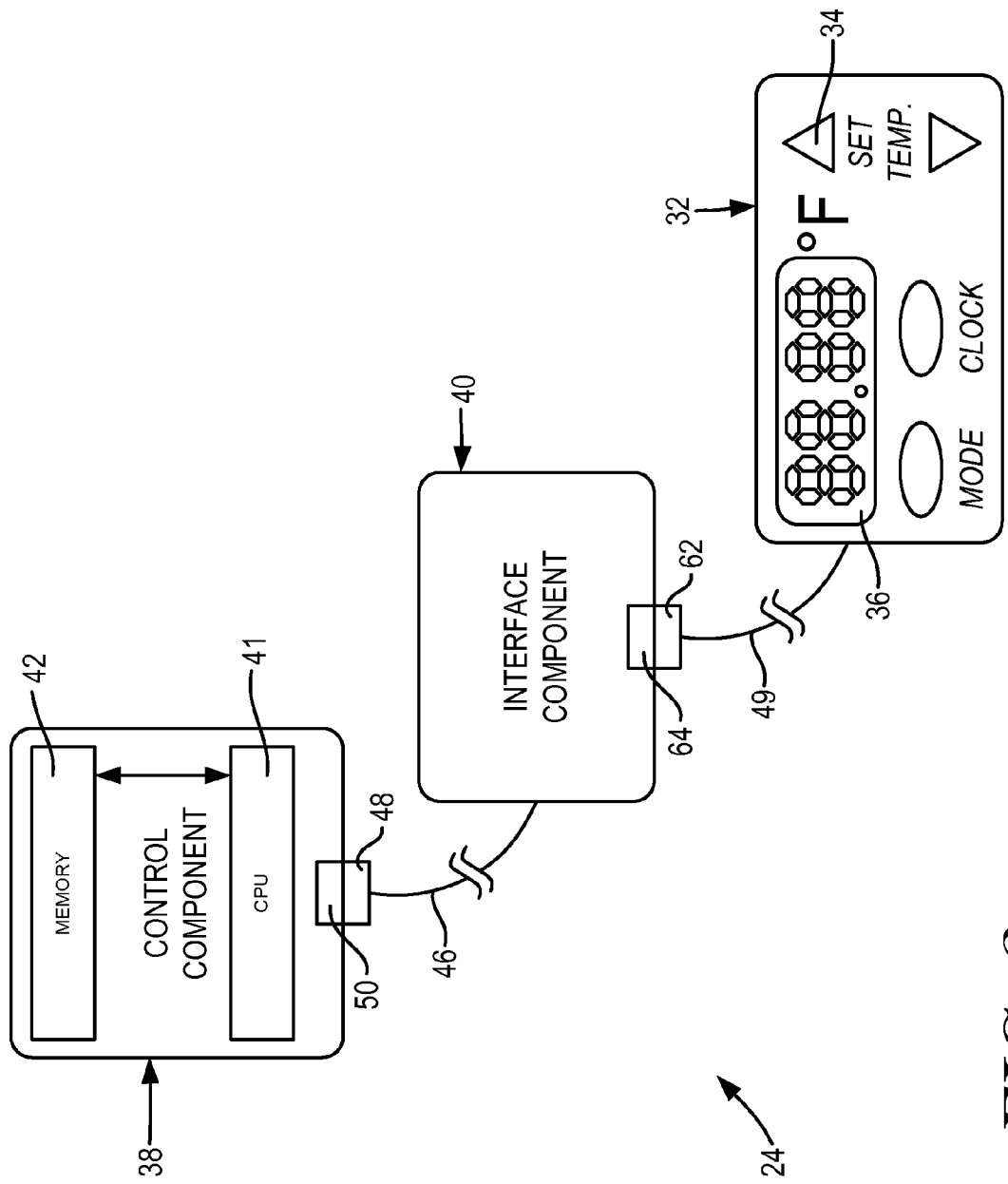
FIG. 3 schematically shows a control system including a control board, interface component and a control panel according to an aspect of the present invention.

The control panel 32 is included as part of the control system 24 shown in the embodiment of FIG. 3, allowing the operator to input commands, select an operating mode, and otherwise control operation of a plurality of different model variants of the refrigeration appliance 10. According to the present embodiment, the control system 24 also includes a control board 38 that has a configuration common to each of the model variants and an interface component 40 that processes information transmitted between the control panel 32 and the control component. The commonly-configured control board 38 is provided to two or more model variants of the refrigeration appliance 10, which in the present embodiment includes an all refrigerator 28 and a wine cooler 30. In other words, one control board 38 can be installed in the all refrigerator 28 and another control board 38, which is configured generally the same as the control board 38 installed in the all refrigerator 28, and includes the same operational components, can be installed in the wine cooler 30. According to some embodiments, a commonly-configured control board 38 can be provided to all different model variants of the refrigeration appliance 10 for a given product line. Providing a commonly-configured control board 38 minimizes the number of different parts specific to each model variant.

The control board 38 can include suitable electronic circuitry interconnected by a network of metallic traces, vias, through holes and the like to selectively conduct an electric current to process and initiate control operations for controlling the refrigeration circuit 12 and other electrically actuated features of the different model variants of the refrigeration appliance 10. The control board 38 can also include a computer-readable memory 42 storing a library of computer-executable instructions for governing the control of each model variant with which the control board 38 is compatible to be installed, or can include electronic hardware circuitry to respond to various inputs and properly control each model variant. Regardless of the implementation of the control board 38, to computer-executable instructions and/or electronic hardware define a predetermined control routine specific to each of the plurality of different model variants, and optionally for every model variant of the refrigeration appliance 10. The computer-readable memory 42 can be any device capable of storing computer-executable instructions to be carried out by a central processing unit 41 such as a microcontroller to produce a desired output signal to initiate a control command. Examples of the computer-readable memory 42 include any non-volatile memory, such as a magnetic storage medium, a flash storage medium such as an electrically erasable programmable read only memory ("EEPROM"), an optical storage medium, or any other suitable device for storing computer-executable instructions in an electronic format.

The control system 24 further comprises an interface component 40 that can translate signals corresponding to a command input by the operator via the control panel 32 and communicate that command in the form of electronic data to a central processing unit 41 of the control board 38. As shown in FIG. 3, the interface component 40 is separate from the control board 38 and the control panel 32, operatively connected to the control board 38 and control panel 32 by wiring harnesses 46, 49. However, according to alternate embodiments, the interface component 40 can optionally be integrally formed as a portion of the control board 38 or the control panel 32 to ensure compatible communication between the plurality of different control panels 32 to be provided to the plurality of different model variants and the control board 38 that can be commonly provided to those different model variants.

Like the control board 38, the interface component 40 includes a printed circuit board supporting suitable electronic circuitry interconnected by a network of metallic traces, vias, through holes and the like to perform any translation or formatting of the signal corresponding to the command input by the operator via the control panel 32. The user interface unit 40 subsequently transmits a control signal relaying the operator-input command to be received by the control board 38. A wiring harness 46 including one or more electrically conductive wires sheathed in a dielectric material can establish a communication channel between the interface component 40 and the control board 38. A first connector 48 can optionally be provided adjacent a distal end of the wiring harness 46 to cooperate with a compatible second connector 50 provided to the control board 38. For example, one of the connectors 48, 50 can be a male connector including one or more protruding pins while the other one of the connectors 48, 50 can be a female connector. When joined, electrical signals can be transmitted through the connectors 48, 50 and the wiring harness to facilitate communication between the user interface unit 40 and the central control board 38.

The connectors 48, 50 can be modular plug-type connectors having a physical and/or electrical configuration that, when connected, can identify the model variant on which the control board 38 has been installed. For example, the connector 48 attached to the wiring harness 46 can optionally be selected as a conventional 15-pin male, d-sub connector and the connector 50 provided to the control board 38 can be a compatible female d-sub connector, for example. Depending on the model variant of the refrigeration appliance 10 to which the control board 38 is provided, one or more of the pins of the d-sub connector may not be used during control operations, and can optionally be missing altogether from the connector 48. The control board 38 for such embodiments can optionally detect the presence or absence of pins to or from the connector 48, and can identify refer to a lookup table or other data source stored in the computer-readable memory 42 to identify the model variant based on the particular pin configuration of the connector 48.

According to other embodiments, the physical shape of the connector 48 can optionally physically connect with the connector 50 provided to the control board 38 in a unique manner that is indicative of the model variant on which the control board 38 has been installed. For example, the central processing unit 41 can optionally execute computer-executable instructions stored in the computer-readable memory 42 to determine, based on the mating of the connectors 48, 50, the particular model variant of the refrigeration appliance 10 on which the control board 38 has been installed. Other embodiments can employ switches (not shown) that are actuated when the connectors 48, 50 are mated to identify the particular model variant.

Similar to the embodiments where the particular model variant to which the control board 38 is provided is determined based on a physical and/or electrical pinout configuration of at least one of connectors 48, 50, another embodiment can optionally identify the particular model variant based at least in part on a connector 62 included as part of a wiring harness 49 between the control panel 32 and the interface component 40, or based on cooperation of the connector 62 with a compatible connector 64 of the interface component 40. For example, the connector 62 can include a physical and/or electrical pinout configuration indicative of the particular model variant on which the control board 38 is installed. Alternately, the wiring harness 49 itself, similar to the wiring harness 46, can be configured differently for each model variant to indicate the particular model variant on which the control board 38 is installed. For instance, the wiring harness 49 can be provided with a different number of wires for transmitting signals between the control panel 32 and the interface component 40.

Yet other embodiments of the control board 38 under the control of the central processing unit 41 can transmit an interrogation signal to interrogate the connection between the connectors 48, 50, the interface component 40, the control panel 32, or any combination thereof, to identify the particular model variant. Such an interrogation signal can optionally cause the interface component 40, the control panel 32, or both to generate an identification signal indicative of the particular model variant on which they have been installed. The interrogation signal, the identification signal or both can optionally be generated automatically, without user intervention, upon initially being powered after a reset condition such as immediately after installation is complete, or immediately after electric power is restored, for example.

According to other embodiments, the control board 38 receives an identification signal for indicating the identity of the model variant without prior transmission of interrogation signal. The identification signal can be transmitted according to such embodiments from the interface component 40, the control panel 32, or a combination thereof automatically, without user intervention, upon being powered on for the first time, or in response to the restoration of electric power following an interruption in the supply of electric power, for example.

Regardless of the source or manner of determining the particular model variant on which the control board 38 is installed, the central processing unit 41 can select and execute the appropriate computer-executable instructions for that particular model variant to control operation of the refrigeration circuit 12. The computer-readable memory 42 stores computer-executable instructions defining control routines for controlling operation of a plurality of different model variants of the refrigeration appliance 10. According to one embodiment, the computer-readable memory 42 stores the computer-executable instructions for a control routine for each model variant of the refrigeration appliance 10. The appropriate computer-executable instructions selected by the central processing unit 41 based on the identification of the model variant to which the control board 38 is provided collectively define the control routine specific to the refrigeration circuit 12 of that particular model variant. The control routine that may optionally be unavailable for execution by the central processing unit 41 if the control board 38 is installed on a different model variant, and may be different than a control routine to be carried out by the central processing unit 41 if the same control board 38 is installed on that different model variant.

The computer-executable instructions of each control routine, when executed by the central processing unit 41, establish a suitable operational state of portions of the refrigeration circuit 12 in response to the sensed temperature within the interior compartment 20 of the model variant. Each control routine defines operational states of the portions refrigeration circuit provided to the model variant on which the control board 38 is installed. For example, if the control board 38 is installed on the all refrigerator 28 model variant, the computer-executable instructions selected will define a control routine that will control operation of the compressor 14, for example, to maintain the temperature in the fresh food compartment to within a suitable tolerance of the set temperature. The set temperature for the all refrigerator 28 model variant can be any desired temperature input via the control panel 32 within a range extending from about 33° F. to about 40° F., alternately within a range extending from about 34° F. to about 38° F. Likewise, if the control board 38 is installed on the all freezer 29 model variant, the computer-executable instructions selected will define a control routine that will control operation of the compressor 14, for example, to maintain the temperature in the freezer compartment to within a suitable tolerance of the set temperature. The set temperature for the all freezer 29 model variant can be input via the control panel 32 to be any desired temperature within a range extending from about −5° F. to about 10° F., alternately within a range extending from about 0° F. to about 5° F. The selection of the appropriate computer-executable instructions based on recognition of the particular model variant on which the control board 38 is installed can occur automatically, without user intervention.

Figure 4:
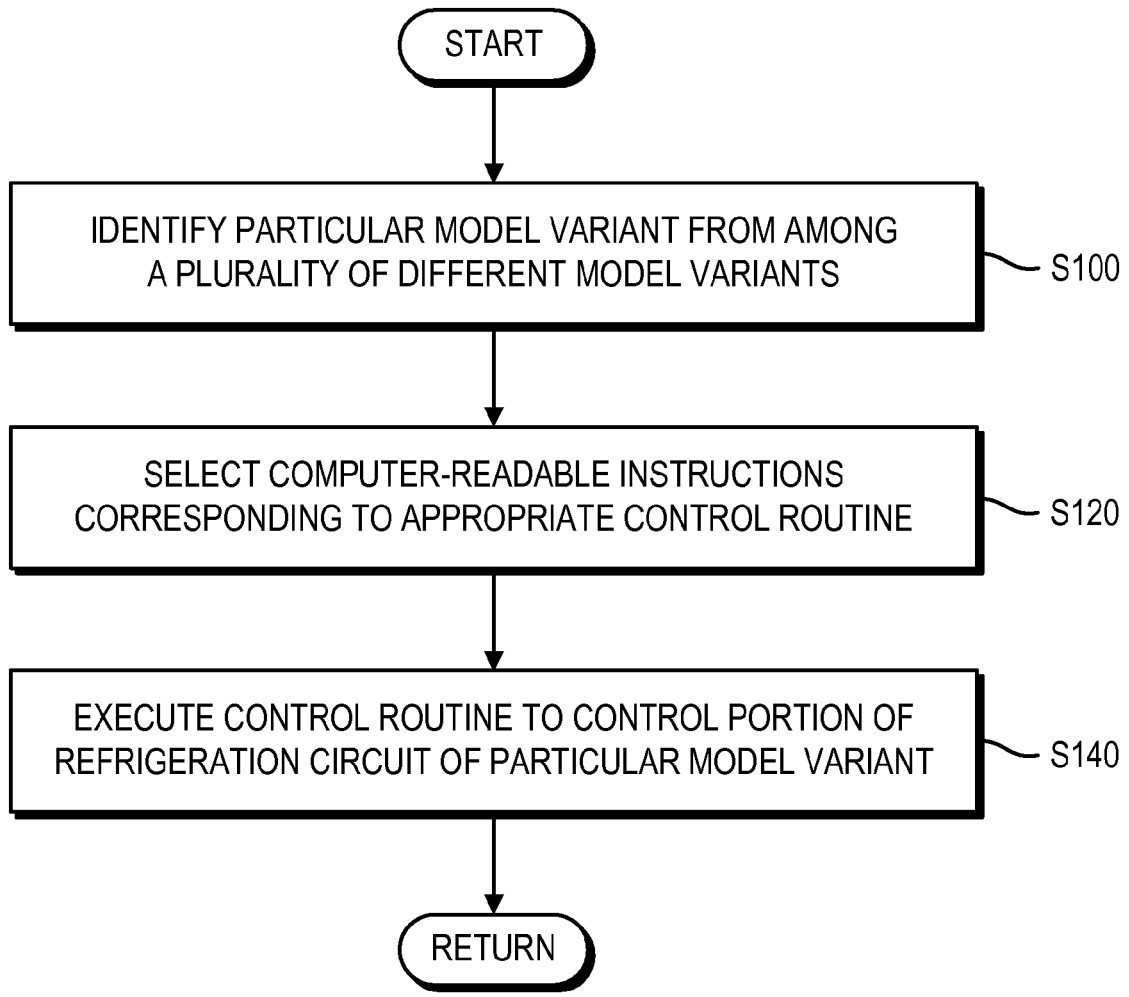
FIG. 4 shows a flow diagram providing an illustration of a general control method according to an aspect of the present invention.

Selection of the appropriate computer-executable instructions based on the particular model variant of the refrigeration appliance 10 is described with reference to the flow diagram shown in FIG. 4. In use, the central processing unit 41 identifies, at step S100, the particular model variant as being one of the plurality of model variants for which computer-executable instructions defining a control routine is stored in the computer-readable memory 42. As described in detail above, the identification of the particular model variant on which the control board 38 is installed at step S100 can be based on a mechanical or electrical pinout configuration of one or more of the connectors 48, 50, 62, 64, a configuration of one or both wiring harnesses 46, 49, an electric signal transmitted between the control panel 32 and the control board 38, by evaluating any other feature of the refrigeration appliance 10 or the control system 24, or any combination thereof.

Responsive to the identification of the particular model variant, the central processing unit selects for execution at step S120 the computer-executable instructions from the computer-readable memory 42 defining the appropriate control routine for the particular model variant that was identified at step S100. The plurality of available control routines from which the appropriate control routine was selected at step S120 can each, when executed, establish different operational states of portions of the refrigeration circuit 12 in a manner specific to the respective model variant to which the control board 38 is provided. Thus, the plurality of control routines can each be different.

Once the appropriate control routine has been selected at step S120, the central processing unit 41 of the control board 38 can initiate execution of the computer readable instructions corresponding to the appropriate control routine for the particular model variant at step S140. The appropriate control routine for the particular model variant can, when executed, control operation of the compressor 14, fan 27, expansion valve 18, any other portion of the refrigeration circuit 12, or any combination thereof in response to a sensed temperature within the interior compartment 20 of the particular model variant of the refrigeration appliance 10. The control routine for the particular model variant establishes the operational state of the compressor 14, expansion valve 18, fan 27, any other portion of the refrigeration circuit 12, or any combination thereof to bring about the desired temperature within the interior compartment 20 as input via the control panel 32, stored in the computer-readable memory 42, or otherwise entered into the control system 24.

Illustrative embodiments have been described, hereinabove. It will be apparent to those skilled in the art that the above devices and methods may incorporate changes and modifications without departing from the general scope of this invention. It is intended to include all such modifications and alterations in so far as they come within the scope of the appended claims.

What is claimed is:

1. A method of controlling operation of a refrigeration appliance comprising a plurality of model variants, the plurality of model variants comprising at least a first model variant and a second model variant that are each to be provided with a control board having a common configuration, the method comprising:
    identifying the first model variant as being one of the plurality of model variants to be controlled;
    responsive to said identifying, selecting a suitable control routine from among a plurality of available control routines that are accessible to the control board for controlling operation of the plurality of model variants, the plurality of available control routines comprising at least a first control routine to be executed for controlling operation of a portion of a refrigeration circuit provided to the first model variant and a second control routine to be executed for controlling operation of a portion of a refrigeration circuit provided to the second model variant, wherein the first control routine is different than the second control routine; and
    executing the first control routine to control operation of the portion of the refrigeration circuit provided to the first model variant to adjust an internal temperature of an enclosed chamber of the first model variant to a refrigerated temperature that is less than an ambient temperature in an environment of the first model variant, wherein said identifying the first model variant comprises:
        evaluating a configuration of a wiring harness provided to the first model variant for transmitting a control signal to the control board provided to the first model variant; and
        responsive to said evaluating, selecting the first model variant from among the plurality of model variants as being the one of the model variants that the control board is operatively coupled to for controlling operation of the portion of the refrigeration circuit provided to the first model variant.

2. The method of claim 1, wherein a modular connector provided to the wiring harness for coupling the wiring harness to the control board is different for each model variant, and the modular connector is indicative of the first model variant.

3. The method of claim 1, wherein each of the first and second control routines comprises computer-executable instructions stored by a computer-readable memory provided to the control board, wherein said computer-executable instructions of the first and second control routines are to be executed for controlling the portion of the refrigeration circuit provided to the first and second model variants, respectively, and said identifying of the first model variant is based at least in part on a signal transmitted from at least one of a control panel provided to the first model variant and an interface component operatively disposed between the control panel and the control board of the first model variant.

4. The method of claim 1, wherein the first model variant comprises a fresh food compartment having an internal temperature that is to be maintained within a range from about 34° F. to about 42° F., and the second model variant comprises a wine compartment for storing wine and having an internal temperature that is to be maintained within a range from about 49° F. to about 60° F.

5. The method of claim 1, wherein the first model variant comprises a fresh food compartment having an internal temperature that is to be maintained within a range from about 34° F. to about 42° F., and the second model variant comprises a freezer compartment having an internal temperature that is to be maintained at or below a temperature of about 5° F.

6. The method of claim 1, wherein said identifying the first model variant comprises:
receiving a signal from a source external to the control board; and
responsive to said receiving, selecting the first model variant from among the plurality of model variants as being the one of the model variants that the control board is operatively coupled to for controlling operation of the first model variant.

7. The method of claim 6, wherein the source is a control panel provided to the first model variant that is operatively connected to communicate with the control board via a wiring harness.

8. The method of claim 6, wherein the source is a user interface component operatively connected between a control panel and the control board.

9. A method of controlling a refrigeration appliance, wherein the refrigeration appliance includes a plurality of different model variants each comprising a commonly configured control board, the method comprising:
evaluating an identification signal to identify a particular model variant to be controlled by the control board;
receiving input entered via a control panel related to a desired operational state of the particular model variant;
selecting an appropriate set of computer-executable instructions for controlling operation of the particular model variant based at least in part on the evaluation of the identification signal; and
initiating execution of the appropriate set of computer-executable instructions to control operation of the particular model variant identified by the identification signal, wherein
the identification signal is transmitted by a user interface board along a wire harness coupled to transmit electronic signals between the user interface board and the control board to identify the model variant of the refrigeration appliance, the identification signal being transmitted in response to an interrogation of a connection between the control board and the wire harness by the control board.

10. The method according to claim 9, wherein the step of selecting the appropriate set of computer-executable instructions is performed automatically, without intervention by an operator.

11. The method according to claim 9, wherein the appropriate set of computer-executable instructions is chosen from among a library of computer-executable instruction sets stored within a computer-readable memory provided to the refrigeration appliance, wherein at least one computer-executable instruction set is specific to each model variant.

12. A refrigeration appliance that includes at least a first model variant and a second model variant that is different than the first model variant, each of the first and second model variants comprising:
a refrigeration circuit through which a refrigerant travels to remove thermal energy from an internal compartment of the refrigeration appliance, the refrigeration circuit comprising at least a compressor and an evaporator;
a commonly-configured central control board to be installed on each of the first and second model variants and comprising a computer-readable memory storing a library of computer-executable instructions that define at least one predetermined control routine specific to each different model variant for controlling operation of the refrigeration circuit; and
a control panel operatively coupled to communicate with the central control board and comprising an input device an operator can use to input a desired operational state of the refrigeration appliance, wherein
the central control board identifies the model variant based at least in part on a configuration of a wiring harness operatively connected to the central control board and initiates execution of appropriate computer-executable instructions from the library to carry out the control routine specific to the model variant in response to identifying the model variant based on the configuration of the wiring harness.

13. The refrigeration appliance according to claim 12 further comprising a user interface board that receives input signals from the control panel and transmits the input signals to be interpreted by the central control board to establish the desired operational state of the refrigeration appliance.

14. The refrigeration appliance according to claim 12 further comprising a user interface board disposed electrically between the control panel and the central control board for interpreting commands input via the control panel and transmitting the commands to be received by the central control board.

* * * * *